Patented Sept. 9, 1952

2,610,194

UNITED STATES PATENT OFFICE 2,610,194

VAT DYESTUFFS

Walter Jenny, Reinach, near Basel, and Walter Kern, Sissach, Switzerland, assignors to Ciba Limited, Basel, Switzerland No Drawing. Application July 12, 1948, Serial No. 38,186. In Switzerland July 17, 1947

11 Claims. (Cl. 260—372)

It is known that 1:4-dibenzoylamino-anthraquinone, and especially substitution products of that compound which contain in at least one benzoyl radical sulfone groups, for example, alkyl- or aralkyl-sulfone groups, are valuable vat dyestuffs. These dyestuffs may be obtained, for example, by reacting a 1:4-diaminoanthraquinone with 2 mols of a reactive derivative of an alkyl or aralkyl sulfone of benzoic acid. Asymmetrical dyestuffs, which are often of value, are obtained by reacting 1 mol of 1-amino-4-benzoylaminoanthraquinone with 1 mol of a reactive derivative of such an acid, or by reacting 1 mol of a 1-amino-4-(alkyl- or aralkyl-sulfone-benzoyl)-aminoanthraquinone with 1 mol of a reactive derivative of benzoic acid, for example, its acid chloride.

However, the dyestuffs of the kind referred to do not combine all the desirable properties such as purity of shade and fastness to severe wet treatments, such as kier boiling, etc., and it is an object of the present invention to provide improved dyestuffs which unite these favorable properties.

The present invention is based on the observation that especially valuable vat dyestuffs of the 1:4-diacylaminoanthraquinone series, which contain once the residue of an alkyl-sulfone-benzoic acid, are obtained by choosing as starting materials anthraquinone derivatives which are substituted by halogen in the 6- or 7-position.

According to this invention, therefore, a 6- or 7-halogen-1:4-diaminoanthraquinone, of which one amino group may be acylated, is treated with an acylating agent or acylating agents, and the components are so chosen that in the resulting dyestuff both amino groups are acylated and one of the amino groups contains the radical of an alkyl-sulfone-benzoic acid and the other amino group contains an acyl radical which is free from substituents containing the group —SO$_2$—.

The 1:4-diamino- or 1-amino-4-acylamino-6- or -7-halogenanthraquinones used as starting materials in the present invention may contain as halogen, for example, bromine or especially chorine.

The choice of the acylating agent to be used depends on whether a halogen-substituted 1:4-diamino-anthraquinone or 1-amino-4-acylaminoanthraquinone is used as starting material, and in the latter case on the nature of the acyl radical already present.

When a 6-halogen-1:4-diamino-anthraquinone is used the acylations may be carried out in either order of succession, on the one hand, with an acylating agent yielding the radical of an alkyl-sulfone-benzoic acid and, on the other, with an acylating agent yielding an acyl radical which is free from substituents containing the group —SO$_2$—. Obviously, as is known, care must be taken that in the treatment with the acylating agent which is used first no substantial quantity of the 1:4-diacyl-compound is formed and also that no substantial quantity of the 1:4-diaminocompound remains unchanged. The desired result is secured most surely by isolating, and if desired purifying, the 1-amino-4-acylamino-6- or -7-halogen-anthraquinone formed in the first stage. In certain cases the isolation of the product formed first may be dispensed with, and in especially favorable cases it may even be possible to react both of the acylating agents in a single operation, provided it has been found that the final product is practically the same as that obtained by a two-stage treatment.

When a 6- or 7-halogen-1:4-diamino-anthraquinone of which one amino group is already acylated is used, the choice of the acylating agent depends on the nature of the acyl radical already present in the molecule. When the acylated amino group contains an acyl radical which is free from substituents containing the group —SO$_2$—, an acylating agent must be chosen which yields the radical of an alkyl-sulfone-benzoic acid; and when the acylated amino group contains an alkyl-sulfone-benzoyl radical, an acylating agent must be chosen which yields an acyl radical free from substituents containing the group —SO$_2$—.

6- or 7-halogen-monoacyl-1:4-diaminoanthraquinone may be obtained, for example, by monoacylating the corresponding diaminoanthraquinones, or by starting from 1-amino-4-nitro-6- or -7-halogen-anthraquinones, acylating and subsequently reducing the nitro group.

As acylating agents which are derived from alkyl-sulfone-benzoic acids there come into consideration, more especially, those which contain as the alkyl radical a radical of low molecular weight, for example, a radical containing at most 6 carbon atoms, for instance, a methyl, ethyl, propyl, isopropyl or butyl group. The alkyl-sulfone group may be present, for example, in the meta-position or in the para-position relatively to the carboxyl group. There may be mentioned, more especially, acylating agents which yield the radical of 3- or 4-methyl-sulfone-benzoic acid, of 3- or 4-ethyl-sulfone-benzoic acid, of 4-isopropyl-sulfone-benzoic acid or of 4-n-butyl-sulfone-benzoic acid. The aforesaid radicals may alternatively be present in the monoacylated 6- or 7-halogen-1:4-diaminoanthraquinones when they are used as starting materials.

As acylating agents which are free from substituents containing the group —SO₂— there come into consideration, more especially, those of the aromatic series such as benzoic acid or halogen-benzoic acids, for example, para-chloro- or para-bromo-benzoic acid, or functional derivatives of these acids. Especially valuable dyestuffs can be obtained by using as an acylating agent of this kind one which yields the radical of an alkoxy-benzoic acid in which the alkoxy group is advantageously of low molecular weight, for example, a methoxy group, and is in para-position relatively to the carboxyl group. Acyl residues of the aforesaid kind may alternatively be present in the monoacylated diaminoanthraquinones when they are used as starting materials.

For carrying out the acylation there may be used in known manner functional derivatives of the appropriate acids such as their anhydrides or amides, but advantageously their acid halides, especially the acid chlorides. The reaction may be conducted, for example, in a high boiling solvent such as chlorobenzene, dichlorobenzene, nitrobenzene or naphthalene at a moderate or high temperature.

The products of the invention are 1:4-diacylamino-6- or -7-halogenanthraquinones, in which one of the acyl groups is the radical of an alkylsulfone benzoic acid and the other acyl group is free from substituents containing the group —SO₂—. They are valuable vat dyestuffs. They can be used for dyeing, and especially for printing, a very wide variety of materials, especially vegetable materials such as cotton, linen and artificial silk and staple fibers of regenerated cellulose.

The following examples illustrate the invention, the parts and percentages being by weight unless otherwise stated and the relationship of parts by weight to parts by volume being the same as that of the kilogram to the liter.

*Example 1*

20 parts of 3-methyl-sulfone-benzoic acid are suspended in 350 parts of dry nitrobenzene and, after the addition of 15 parts of thionyl chloride and a small quantity of pyridine, the whole is stirred for 1½ hours at 110–120° C. 37 parts of 1 - benzoyl - amino - 4 - amino - 6 - chloranthraquinone are then added. After stirring for a further 2 hours at 120–130° C., the whole is allowed to cool and the dyestuff of the formula

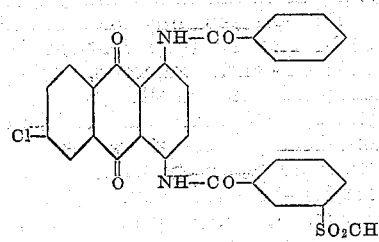

which precipitates in the form of small red crystals is separated by suction, washed well with boiling alcohol and dried. It dissolves in concentrated sulfuric acid with a blue-red coloration and dyes cotton from a violet vat very fast bluish pink tints.

1 - benzoylamino - 4 - amino - 6 - chloranthraquinone is obtained, for example, by the benzoylation of 1-amino-4-nitro-6-chloranthraquinone, and subsequent reduction of the nitro-group by one of the usual methods. The compound is obtained in the form of small violet needles by recrystallization from ortho-dichlorobenzene.

*Example 2*

30.3 parts of 1-(para-methyl-sulfone-benzoylamino)-4-amino-6-chloranthraquinone are dispersed in 250 parts of dry nitrobenzene and, after the addition of 20 parts of benzoyl chloride, the whole is stirred for 2 hours at 130–140° C. The dyestuff of the formula

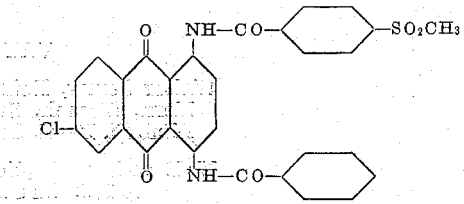

which precipitates upon cooling in the form of small red crystals is separated by filtering with suction, well washed with boiling alcohol and dried. It dissolves in concentrated sulfuric acid with a red coloration and dyes cotton from an olive colored vat very fast pure pink tints.

1 - (para - methyl - sulfone - benzoylamino) - 4-amino-6-chloranthraquinone may be prepared in the following manner:

40 parts of para-methyl-sulfone-benzoic acid are dispersed in 380 parts of dry nitrobenzene and, after the addition of 30 parts of thionyl chloride and a small quantity of pyridine, the whole is stirred for 1½ hours at 110–120° C. There are then added 59 parts of 1-amino-4-nitro-6-chloranthraquinone, and the whole is stirred for a further 2 hours at 120–130° C. Upon cooling, 1-(para-methyl-sulfone-benzoylamino)-4-nitro-6-chloranthraquinone precipitates in the form of small yellow crystals, which are separated with suction and washed well with boiling alcohol. In order to reduce the nitro-group the product is stirred in 700 parts of ortho-dichlorobenzene with 120 parts of phenyl-hydrazine for ¾ hour at 135–140° C. Upon cooling, 1 - (para - methyl - sulfone - benzoylamino) - 4-amino - 6 - chloranthraquinone precipitates in the form of small violet crystals.

*Example 3*

20 parts of para-methyl-sulfone-benzoic acid are dispersed in 350 parts of dry nitrobenzene and, after the addition of 15 parts of thionyl chloride and a very small quantity of pyridine, the whole is stirred for 1½ hours at 110–120° C. 41 parts of a mixture of 1-(para-chlorobenzoylamino) - 4 - amino - 6 - chloranthraquinone and 1 - (para - chlorobenzoylamino) - 4 - amino - 7-chloranthraquinone are then added, and the whole is stirred for a further 2 hours at 120–130° C. The dyestuff mixture which contains the dyestuffs of the formulae and

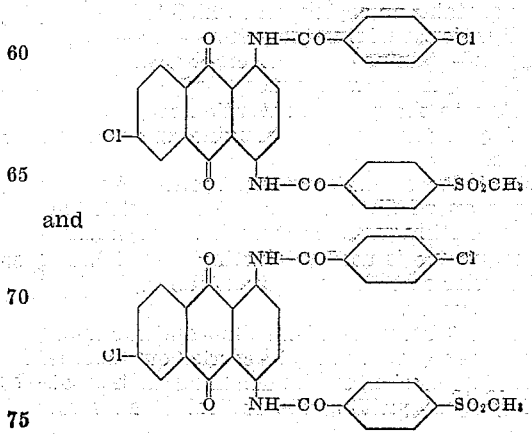

and which precipitates in the form of small red crystals upon cooling is separated by filtering with suction, and washed well with boiling alcohol and dried. It dissolves in concentrated sulfuric acid with a red coloration and dyes cotton from an olive colored vat fast pink tints.

The above mentioned mixture of 1-(para-chlorobenzoylamino)-4-amino-6-choranthraquinone and 1-(parachlorobenzoylamino)-4-amino-7-chloranthraquinone is prepared by acylating a mixture of 1-amino-4-nitro-6-chloranthraquinone and 1-amino-4-nitro-7-chloranthraquinone (prepared as described in U. S. Patent No. 2,134,654 for making the pure 6-chloro-derivative) and subsequently reducing the nitro groups. The product forms small violet needles when recrystallized from ortho-dichlorobenzene.

By using in this example, instead of the foregoing mixture of anthraquinone components, a corresponding mixture of 1-benzoylamino-4-amino-6-chloranthraquinone and 1-benzoylamino-4-amino-7-chloranthraquinone there is obtained a dyestuff which dissolves in concentrated sulfuric acid with a red coloration and dyes cotton from an olive vat bluish pink tints.

By using meta-methyl-sulfone benzoic acid, instead of para-methyl-sulfone benzoic acid, there is obtained a dyestuff which dyes somewhat less bluish tints.

Example 4

80 parts of meta-methyl-sulfone benzoic acid are dispersed in 1250 parts of dry nitrobenzene and, after the addition of 60 parts of thionyl chloride and 1 part of pyridine, the whole is stirred for 1½ hours at 110–120° C. 160 parts of 1-(4'-methoxy-benzoylamino)-4-amino-6-chloranthraquinone are then added, and the whole is stirred for a further 3 hours at 125–130° C. Upon cooling, the dyestuff of the formula

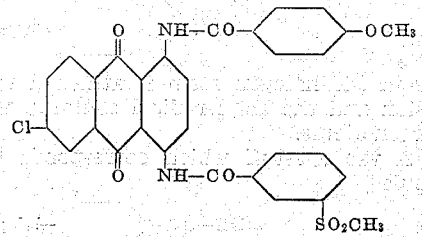

precipitates in the form of small red needles. It is separated by filtering with suction, and washed well with boiling alcohol and dried. It dissolves in concentrated sulfuric acid with a dirty brown coloration and dyes cotton from a violet vat pure, strong bluish-pink tints having excellent properties of fastness.

1-(4'-methoxy-benzoylamino)-4-amino-6-chloranthraquinone may be prepared in the following manner:

124 parts of 4-methoxy-benzoic acid are dispersed in 1250 parts of dry nitrobenzene and, after the addition of 120 parts of thionyl chloride and 1 part of pyridine, the whole is stirred for 2 hours at 60–70° C. 240 parts of 1-amino-4-nitro-6-chloranthraquinone are then added, and the whole is stirred for a further 2 hours at 120–130° C. The compound which precipitates in the form of yellow crystals upon cooling, is separated by filtering with suction, washed well with boiling alcohol and reduced, for example, in ortho-dichlorobenzene with phenyl-hydrazine at 135–140° C. When recrystallized from ortho-dichlorobenzene 1-(4'-methoxy-benzoylamino)-4-amino-6-chloranthraquinone forms small violet crystals, which dissolve in concentrated sulfuric acid with a green coloration.

Example 5

20 parts of para-methyl-sulfone-benzoic acid are dispersed in 330 parts of dry nitrobenzene and, after the addition of 15 parts of thionyl chloride and 0.5 part of pyridine, the whole is stirred for 1½ hours at 110–120° C. 40 parts of 1-(4'-methoxy-benzoylamino)-4-amino-6-chloranthraquinone (see Example 4) are then added, and the whole is stirred for a further 2 hours at 120–130° C. The dyestuff of the formula

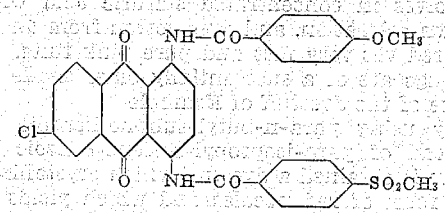

which precipitates in the form of small red crystals upon cooling is separated by filtering with suction, and washed well with boiling alcohol and dried. It dissolves in concentrated sulfuric acid with a dirty brown coloration and dyes cotton from a violet vat powerful pure pink tints. The dyeings have a more yellow shade than those of the dyestuff described in Example 4.

Example 6

23 parts of para-isopropyl-sulfone-benzoic acid are dispersed in 350 parts of dry nitrobenzene, and after the addition of 15 parts of thionyl chloride and 0.5 part of pyridine, the whole is stirred for 1½ hours at 70–80° C. 37 parts of 1-benzoylamino-4-amino-6-chloranthraquinone are then added, and the whole is stirred for a further 2 hours at 120–130° C. Upon cooling, the dyestuff of the formula

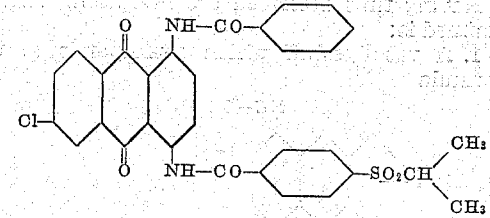

precipitates in the form of small red crystals which are separated by filtering with suction, and washed well with boiling alcohol and dried. It dissolves in concentrated sulfuric acid with a red coloration and dyes cotton from an olive colored vat very fast and pure pink tints.

By using para-n-butyl-sulfone-benzoic acid, instead of para-isopropyl-sulfone benzoic acid, there is obtained a similar dyestuff which dyes somewhat yellower tints.

Example 7

23 parts of para-isopropyl-sulfone-benzoic acid are dispersed in 350 parts of dry nitrobenzene and, after the addition of 15.5 parts of thionyl chloride and 0.5 part of pyridine, the whole is stirred for ½ hours at 70–80° C., 40 parts of 1-(4'-methoxy-benzoyl-amino)-4-amino-6-chloranthraquinone are then added, and the whole is stirred for a further 2 hours at 120-130° C. Upon cooling, the dyestuff of the formula

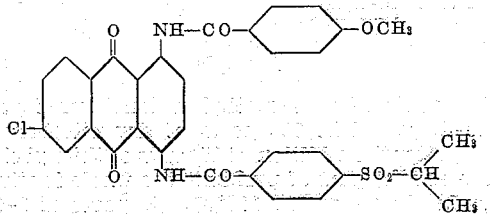

precipitates in the form of small red crystals which are separated by filtering with suction, and washed well with boiling alcohol and dried. It dissolves in concentrated sulfuric acid with a brown coloration, and dyes cotton from an olive colored vat very fast and pure pink tints. The dyeings are of a substantially bluer shade than those of the dyestuff of Example 6.

By using para-n-butyl-sulfone-benzoic acid, instead of para-isopropyl-sulfone-benzoic acid, there is obtained a dyestuff which crystallizes in the form of red needles and which yields very similar colorations in solution. The dyeings on cotton are of somewhat bluer shade than those of the corresponding iso-propyl-derivative.

*Example 8*

1 part of the dyestuff obtained as described in Example 1 is vatted in 200 parts of water with the addition of 4 parts by volume of caustic soda solution of 36° Bé. and 2 parts of sodium hydrosulfite at about 50° C. The resulting stock vat is added to a dyebath of 2800 parts of water which contains 8 parts by volume of caustic soda solution of 36° Bé. and 3 parts of sodium hydrosulfite. 100 parts of cotton are entered at 25° C. After ¼ hour, 45 parts of sodium chloride are added and dyeing is carried on for 1 hour at 25-30° C. The cotton is then squeezed, oxidized in the air, rinsed, acidified, again rinsed, and soaped at the boil. It is dyed a very fast bluish-pink tint.

Having thus described the invention, what is claimed is:

1. A vat dyestuff which corresponds to the formula

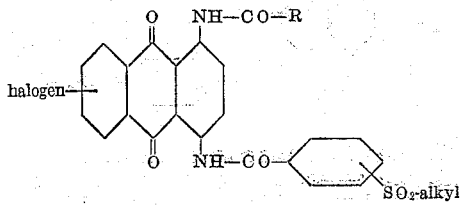

wherein the halogen atom is attached to a β-position and R stands for a mononuclear aryl radical free from groupings containing the radical —SO₂ and wherein the alkyl radical contains at most 6 carbon atoms.

2. A vat dyestuff which corresponds to the formula

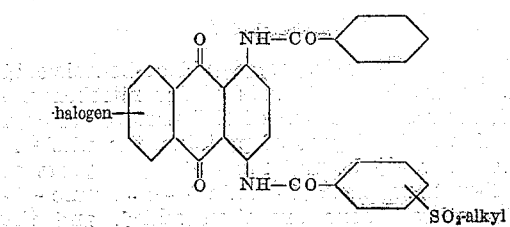

wherein the halogen atom is attached to a β-position and wherein the alkyl radical contains at most 6 carbon atoms.

3. A vat dyestuff which corresponds to the formula

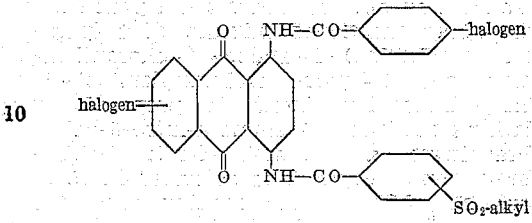

wherein the halogen atom on the left hand side of the formula is attached to a β-position and wherein the alkyl radical contains at most 6 carbon atoms.

4. A vat dyestuff which corresponds to the formula

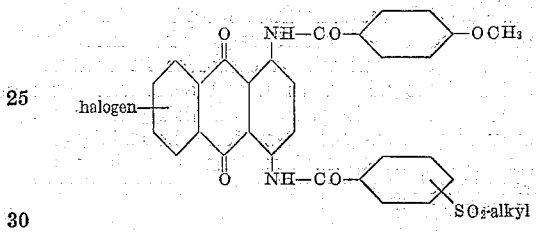

wherein the halogen atom is attached to a β-position and wherein the alkyl radical contains at most 6 carbon atoms.

5. A vat dyestuff which corresponds to the formula

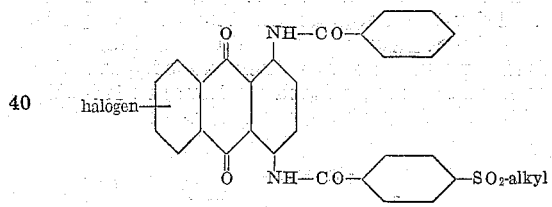

wherein the halogen atom is attached to a β-position and the alkyl radical contains at most 6 carbon atoms.

6. A vat dyestuff which corresponds to the formula

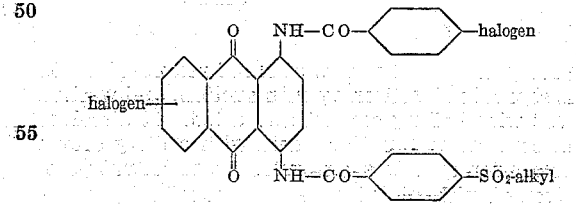

wherein the halogen atom on the left hand side of the formula is attached to a β-position and the alkyl radical contains at most 6 carbon atoms.

7. A vat dyestuff which corresponds to the formula

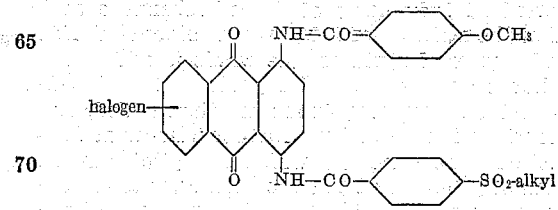

wherein the halogen atom is attached to a β-position and the alkyl radical contains at most 6 carbon atoms.

8. The vat dyestuff of the formula

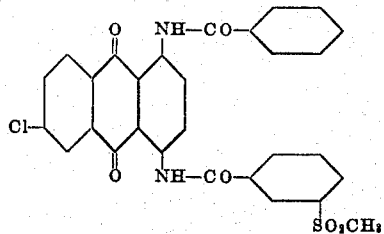

9. The vat dyestuff of the formula

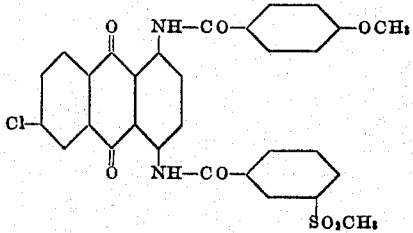

10. The vat dyestuff of the formula

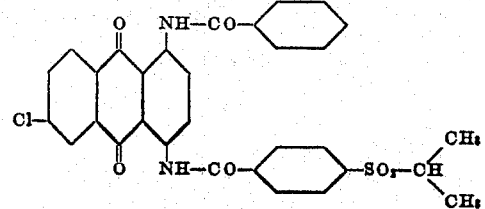

11. The vat dyestuff of the formula

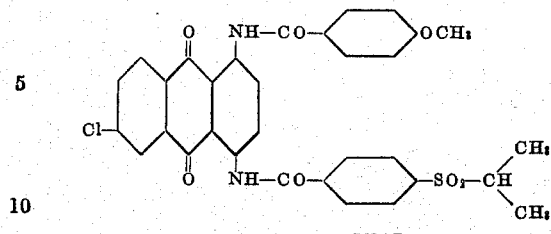

WALTER JENNY.
WALTER KERN.

REFERENCES CITED

The following references are of record in the file of this patent:

UNITED STATES PATENTS

| Number | Name | Date |
|---|---|---|
| 2,134,654 | Lulek | Oct. 25, 1938 |
| 2,190,751 | Zerweck et al. | Feb. 20, 1940 |
| 2,315,788 | Gutzwiller | Apr. 6, 1943 |
| 2,356,060 | Irving et al | Aug. 15, 1944 |
| 2,377,145 | Gutzwiller | May 29, 1945 |
| 2,386,309 | Gutzwiller | Oct. 9, 1945 |
| 2,433,551 | Gutzwiller | Dec. 30, 1947 |
| 2,453,285 | Von Allmen et al. | Nov. 9, 1948 |